(12) United States Patent
Lin et al.

(10) Patent No.: US 6,748,019 B1
(45) Date of Patent: Jun. 8, 2004

(54) DYNAMIC LOAD-BALANCING BETWEEN TWO PROCESSING MEANS FOR REAL-TIME VIDEO ENCODING

(75) Inventors: Weisi Lin, Bukit Batok (SG); Bee June Tye, Choa Chu Kang Central (SG); Ee Ping Ong, Hougang (SG)

(73) Assignee: Institute of Microelectronics (SG)

( * ) Notice: Subject to any disclaimer, the term of this patent is extended or adjusted under 35 U.S.C. 154(b) by 0 days.

(21) Appl. No.: 09/452,960

(22) Filed: Dec. 2, 1999

(30) Foreign Application Priority Data

May 21, 1999 (SG) ............................................ 9902417

(51) Int. Cl.[7] ............................................... H04N 7/12
(52) U.S. Cl. .................................. 375/240.24; 709/104
(58) Field of Search ................................ 348/407, 719, 348/406; 375/240, 240.7, 240.18, 240.24; 382/250, 236, 251; 709/104, 226; 718/104

(56) References Cited

U.S. PATENT DOCUMENTS

| | | | | |
|---|---|---|---|---|
| 5,329,318 A | * | 7/1994 | Keith | ........................ 348/699 |
| 5,386,233 A | * | 1/1995 | Keith | ........................ 375/240.07 |
| 5,394,189 A | | 2/1995 | Montomura et al. | |
| 5,557,538 A | | 9/1996 | Retter et al. | |
| 6,122,400 A | * | 9/2000 | Reitmeier | ........................ 382/166 |
| 6,292,822 B1 | * | 9/2001 | Hardwick | ........................ 709/105 |
| 6,345,041 B1 | * | 2/2002 | Kimball et al. | ........................ 370/235 |

OTHER PUBLICATIONS

Yung and K.C. Chu, fast and parallel video encoding by workload balancing, 1/98, 1998 IEEE, 0–7803–4778, 4642–4647.*

* cited by examiner

*Primary Examiner*—Chris Kelley
*Assistant Examiner*—Behrooz Senfi
(74) *Attorney, Agent, or Firm*—Akin Gump Strauss Hauer & Feld LLP

(57) ABSTRACT

A method for use in a real-time video encoder based on two processing means to optimise the use of computing power of the processing means. This is achieved by dynamically load-balancing between two processing means. The load pattern is determined with measures for the progress of motion estimation in one processing means and the idle time in the other. Adaptive adjustment of load balancing is fulfilled via making a decision on whether the DCT/IDCT/Quantization/Dequantization sub-process is skipped for a macroblock. The invention is not constrained to particular motion estimation techniques.

13 Claims, 5 Drawing Sheets

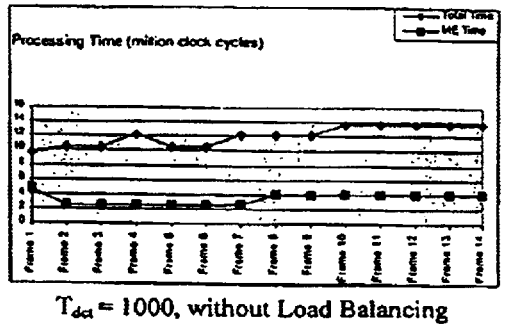
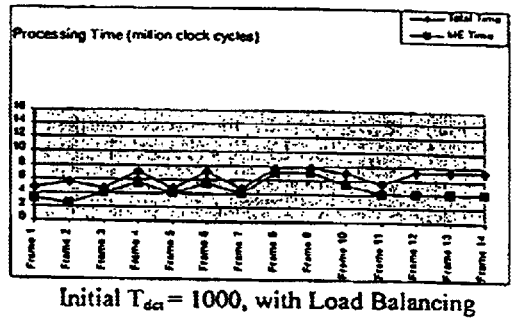
FIG. 4A                    FIG. 4B
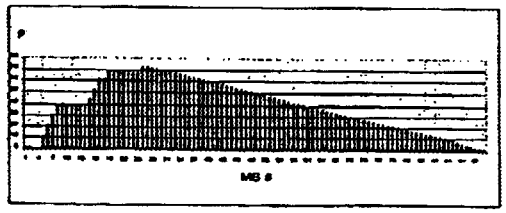
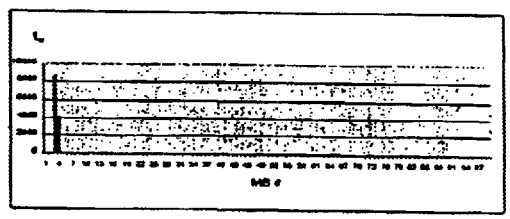
FIG. 5A                    FIG. 5B
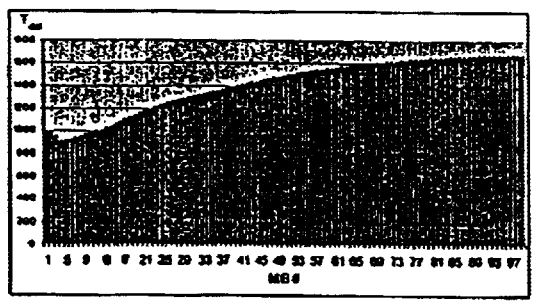
FIG. 6

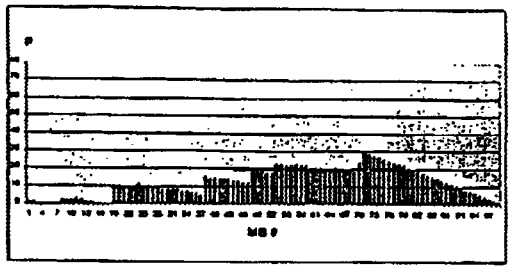
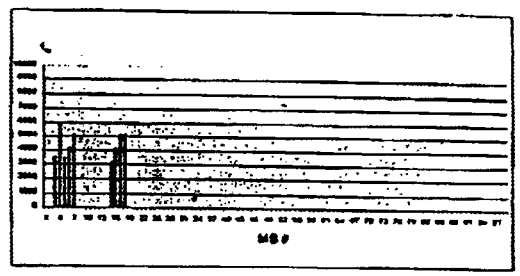
FIG. 7A  FIG. 7B
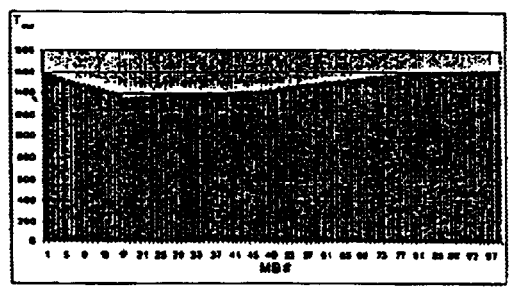
FIG. 7C
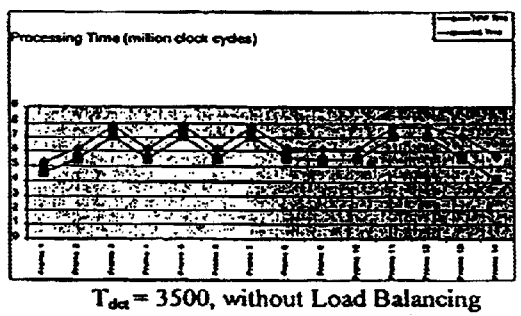
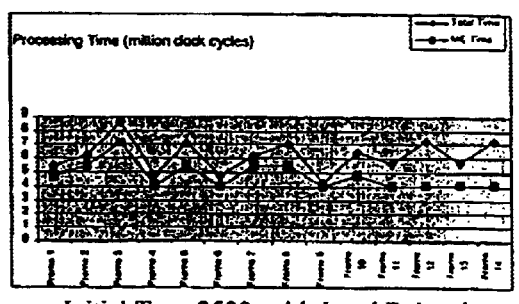
$T_{dct}$ = 3500, without Load Balancing   Initial $T_{dct}$ = 3500, with Load Balancing
FIG. 8A  FIG. 8B

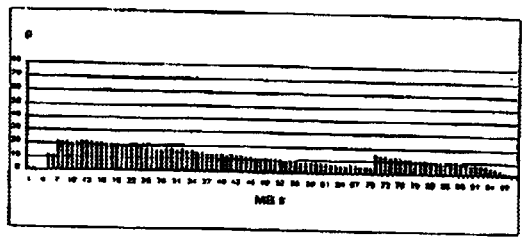
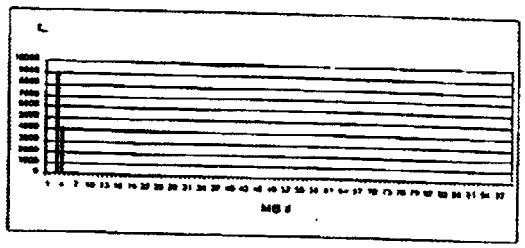
FIG. 11A  FIG. 11B
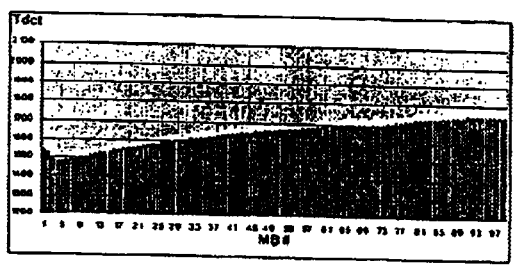
FIG. 11C
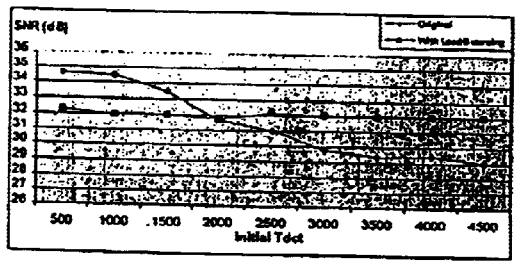
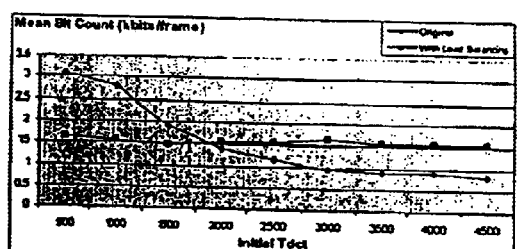
Image Quality (for Y component) Changes　　Mean Bit Count Changes
FIG. 12A  FIG. 12B
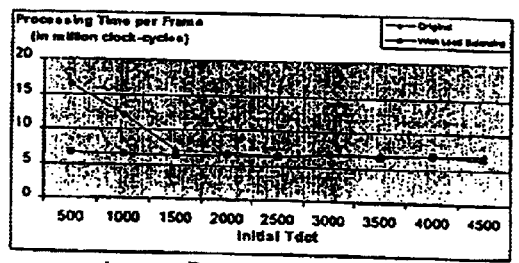
Average Processing Time changes
FIG. 12C

DYNAMIC LOAD-BALANCING BETWEEN TWO PROCESSING MEANS FOR REAL-TIME VIDEO ENCODING

TECHNICAL FIELD

The present invention relates to real-time video compression and coding with multiple processors, and more specifically relates to a method for optimum use of the computing power available for the improvement of the performance of such systems.

BACKGROUND TO THE INVENTION

The most successful techniques for video compression and coding, including the international standards for moving images H.261/3 and MPEG-1/2/4, are based on motion estimation (ME), discrete cosine transform (DCT) and quantisation. FIG. 1 shows the basic procedure by which this is performed. The video input undergoes a series of processes including discrete cosine transform (DCT) 10, quantization (Q) 11, inverse quantization ($Q^{-1}$) 12, inverse discrete cosine transform (IDCT) 13, frame store (FS) 14, interpolation 15, motion estimation (ME) 16, motion compensation (MC) 17, source coding (SC) 18 and buffering 19. The intensive computation involved in these techniques poses challenges to real-time implementation.

Performance with a single processor is limited by silicon technology. Parallel processing is the way to achieve the necessary speedup for video coding with existing algorithms and computing power. However, load balancing among processors is difficult because of the data dependent nature of video processing. Imbalance in load results in a waste of computing power.

The load-balancing problem has been tackled with block-, MB (macroblock)—or GOB (group of blocks)—based approaches due to the inherent data dependency in an image neighbourhood. This is described in, for example, T. Fujii and N. Ohata, "A load balancing technique for video signal processing on a multicomputer type DSP", Proc. IEEE Int'l Conf. Acoustics, Speech, Image Processing, USA, 1988, pp.1981–1984, and K.Asano et al, "An ASIC approach to a video coding processor", Proc. Int'l Conf. Image Processing and its Applications, London, 1992, pp.127–130. Such an approach has various disadvantages: (1) the computational complexity for adjoining MBs/GOBs may not be similar, especially when they are coded (inter- or intra- ) differently or lie on the border of motion; (2) extra computation and storage are required in GOB-based approaches because source coding (e.g., VLC, SAC) is sequential; (3) larger programs and working memory (very often on-chip memory space) are usually needed in real-time implementation because of the need of dedicated code for each processor; (4) some approaches require measurement of timing for every block's processing, and this is not feasible in real-time implementation; (5) there is no opportunity for dynamic load-balancing (the actual amount of computation depends on input pictures).

In the case of two processors, in order to avoid or at least alleviate the problems (1) to (3) listed above, the encoding process for an MB can be divided. This is described in, for example, W. Lin, K. H. Goh, B. J. Tye, G. A. Powell, T. Ohya and S. Adachi, "Real time H.263 video codec using parallel DSP", Proc. IEEE Int'l Conference Image Processing, USA, 1997, pp586–589, also in B. J. Tye, K. H. Goh, W. Lin, G. A. Powell, T. Ohya and S. Adachi, "DSP implementation of very low bit rate videoconferencing system", Proc. Int'l Conf. Information, Communications and Signal Processing, Singapore, 1997, pp1275–1278, and in K. H. Goh, W. Lin, B. J. Tye, G. A. Powell, T. Ohya and S. Adachi, "Real time full-duplex H.263 video codec system", Proc. IEEE First Workshop on Multimedia Signal Processing, USA, 1997, pp445–450. The division of the encoding process is as follows:

Processor 1 ($p_1$)—interpolation, ME, and all auxiliary processing before ME referred to as ME sub-process hereafter for convenience;

Processor 2 ($p_2$)—DCT, IDCT, Quant, Dequant, source coding (SC), and all auxiliary processing after SC referred to as DCT-Q-SC sub-process hereafter for convenience.

The ME sub-process in p is carried out independently, regardless of the progress in $p_2$, until the end of a frame. The DCT-Q-SC sub-process in $P_2$ is also carried out independently provided that there are ME-completed MBs waiting for DCT processing. FIG. 2 depicts a status table for a QCIF Frame with 99 macroblocks showing the progress of $p_1$ and $P_2$. A frame 20 consists of a series of macroblocks (MBs) 21. In this example, the first twelve MBs 22 have had DCT-Q-SC completed. ME but not DCT has been completed on a further seven MBs 23, so the total number of MBs which have had ME completed is nineteen. The rest of the MBs 24 have not yet had ME completed.

In real-time applications, motion search can be performed in an efficient way, such as the 3-stage search or a pruning approach (described in Lin et al, Tye et al and Goh et al mentioned above) to meet the frame-rate requirement. The amount of computation for the DCT-Q-SC sub-process can be controlled in $P_2$ as shown in FIG. 3. When the minimum SAD (sum of absolute difference) for an MB is less than $T_{dct}$ (a threshold to be determined), the DCT-Q will be skipped. The reasoning for this is that when the sum of grey-level difference for an MB against its match in the previous frame is less than a certain value, it is acceptable to code just motion vectors and no DCT coefficients need be processed.

SUMMARY OF THE INVENTION

The object of the invention is to provide a simple and yet effective method to achieve load balance dynamically and adaptively while processing time is minimised, at the same time maintaining reasonable image quality and bit count, or image quality is optimised, at the same time maintaining processing time and bit count.

In general, more than one processor can be used to implement each of the sub-processes for an MB: Processing means 1 ($P_1$)—ME sub-process; Processing means 2 ($P_2$)—DCT-Q-SC sub-process.

In real-time applications, the processing time and coded bit length are major considerations if image quality is acceptable. The invention provides that when the strategy of ME in $P_1$ is set, the DCT-Q-SC subprocess can be adjusted for optimum use of $P_2$'S computing power.

According to the invention, the amount of computation in $P_2$ should be reduced when $P_1$ progresses faster than $P_2$; otherwise the amount of computation in $P_2$ should be increased. The amount of computation in $P_1$ is determined by the ME strategy adopted, and is therefore kept largely constant for similar images, except for some small variation due to the effect in DCT/IDCT/Quantisation/Dequantisation.

The amount of computation in $P_2$ may be controlled by $T_{dct}$. $T_{dct}$ is therefore decided adaptively for each MB in order to optimise the performance of the system, according to the dynamic load pattern between $P_1$ and $P_2$. Determination of load pattern should not introduce significant additional computation to the video encoding process. Preferably, therefore, measures for the idle time in $P_2$ and the progress of ME in $P_1$ may be used.

The invented method balances the workload for video encoding with multi-processors according to dynamic load pattern, rather than dividing the task according to predetermined statistical information. The control is therefore more effective, aiming at optimum use of the computing resources for best performance. An additional advantage is that the additional computation brought to the video encoder by this load balancing method is negligible.

Other objects and advantages of the present invention will become apparent from the following description of preferred embodiments taken in conjunction with the accompanying drawings.

BRIEF DESCRIPTION OF THE DRAWINGS

FIGS. 4A and 4B illustrate a first example of the processing time for frames with and without load balancing;

FIGS. 5A and 5B show the load pattern for a frame before balancing in the first example;

FIG. 6 shows the change in $T_{dct}$ during a frame with balancing for the first example;

FIGS. 7A–7C show the load pattern and change in $T_{dct}$ for a frame with balancing for the first example;

FIGS. 8A and 8B illustrate a second example of timing of frames with and without load balancing;

FIGS. 11A–11C show the load pattern and change $T_{dct}$ in for a frame with balancing for the second example; and FIGS. 12A–12C show a comparison of overall performance with and without load balancing.

DETAILED DESCRIPTION OF THE PREFERRED EMBODIMENTS

Figure 1:
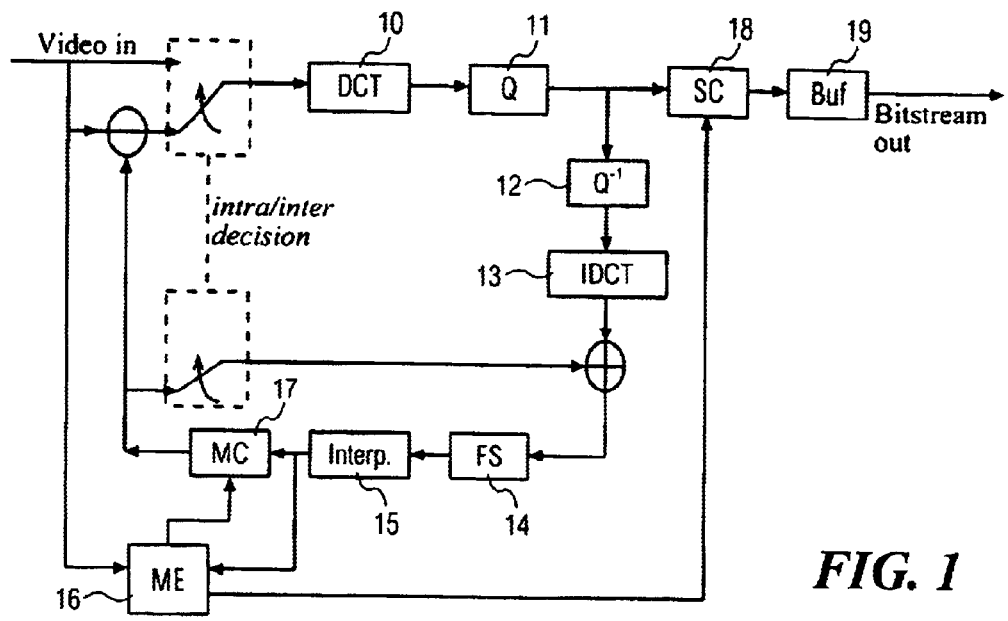
FIG. 1 shows a sequence for video compression and coding based on motion estimation (ME), discrete cosine transform (DCT) and quantization.
Figure 2:
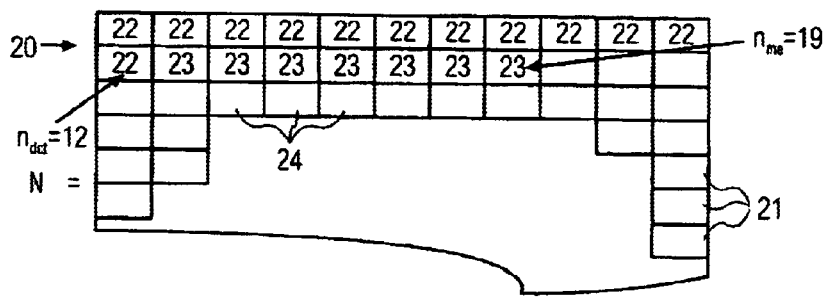
FIG. 2 illustrates a status table for the progress of ME/DCT for a QCIF Frame with 99 macroblocks in the sequence of FIG. 1.
Figure 3:
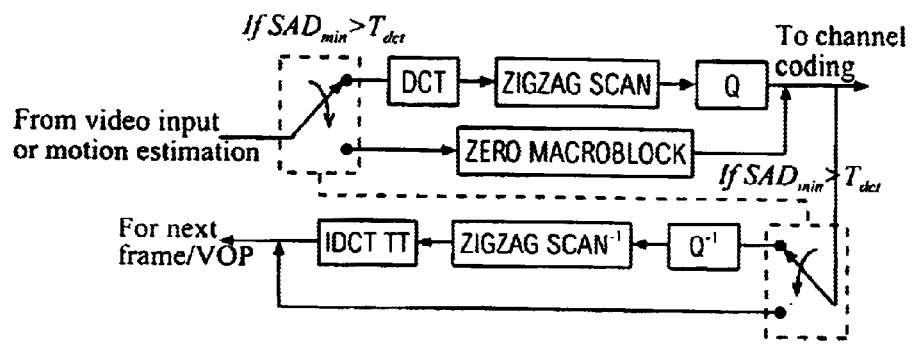
FIG. 3 shows an algorithm to determine whether or not DCT, IDCT, quantization and dequantization are performed.

As shown in FIG. 2, each frame 20 of a video sequence is divided into macroblocks (MBs) 21. The actions to be performed on each MB are shown in FIG. 1. The processing is divided between two groups of processors, $P_1$ and $P_2$, where $P_1$ performs the ME sub-process and $P_2$ performs the DCT-Q-SC sub-process as described above.

Before performing DCT in $P_2$ with the $m^{th}$ MB in a frame/VOP (Video Object Plane), $n_{me}$ is the number of MBs which have completed ME; $n_{dct}$ is the number of MBs which have completed DCT-Q-SC, and $n_{dct} \leq n_{me}$; p is the number of MBs which have completed ME but not yet completed DCT-Q-SC, i.e., $p = n_{me} - n_{dct}$ and $p = 0, 1, 2, \ldots, N$ (N is the total number of MBs in a frame/VOP); $t_w$ (>0) is the idle time interval in $P_2$ while $p=0$, and is measured simply by counting the number of "no operations" while $P_2$ is waiting for the completion of ME in $P_1$; and $T_{dct}^{min} \leq T_{dct} < T_{dct}^{max}$. In FIG. 2, N=99, $n_{me}$=19, $n_{dct}$=12, and p=7.

MB-level control

When $P_2$ is idle (p=0 and $t_w$>0), $T_{dct}$ (m)=$T_{dct}$ (m−1)−$t_w$/$Q_1$ where $Q_1$ is an integer to control the decrease rate of $T_{dct}$. $T_{dct}$ is clamped at $T_{dct}^{min}$. Since $T_{dct}$ is reduced, more MBs are likely to undertake DCT/IDCT/Quantisation/Dequantisation so that the IDCT-Q-SC sub-process is slowed down.

When the progress in $P_1$ is faster (p≧1 and $t_w$=0), $T_{dct}$ (m)=

$T_{dct}$ (m−1)−p/$Q_2$ if $1 \leq p < n_0$ $T_{dct}$ (m−1)+$t_w$/$Q_3$ if $n_0 \leq p \leq n_1$ and p(m)≧p(m−1)

$T_{dct}$ (m−1)+$t_w$/$Q_4$ if $n_0 \leq p \leq n_1$ and p(m)<p(m−1)

where $n_1$ (≧0) is a small positive integer (e.g. less than 4) to keep the progress in $P_1$ slightly faster than that in $P_2$; $n_1$ (≦N) is a positive integer close to N to avoid the adjustment of $T_{dct}$ being applied to the last few MBs in each frame/VOP; $Q_2$, $Q_3$ and $Q_4$ are three other integers to control the change rate of $T_{dct}$ in different situations, and $Q_4 > Q_3$. $T_{dct}$ cannot exceed $T_{dct}^{max}$. As $T_{dct}$ is increased, fewer MBs are likely to undertake DCT/IDCT/Quantisation/Dequantisation so that the DCT-Q-SC sub-process is speeded up.

At the start of the $t^{th}$ frame/VOP, $T_{dct}^{\{t\}}(1) = \Sigma_{m=1,N} T_{dct}^{\{t-1\}}(m)/N$, except for the first frame/VOP in which $T_{dct}^{\{t\}}(1)$ is the initial value set by the user.

Frame/VOP-level Control

A simpler scheme is to control $T_{dct}$ at the frame/VOP level. At the $t^{th}$ frame/VOP $T_{dct}^{\{t\}} = \Sigma_{m=1,N} T_{dct}^{\{t-1\}}(m)/N$ for all MBs. The value of $T_{dct}$ is kept constant for the whole frame/VOP, and updated at the start of a frame/VOP. The control is not as effective and timely as that at MB-level.

Some examples of the use of load balancing will now be shown with reference to FIGS. 4A to 12C. An H.263 video encoder, as described in Lin et al, Tye et al and Goh et al mentioned above, implemented on two parallel processors of Texas Instruments' TMS320C80 is used to evaluate the invented method. It runs au about 7 QCIF frames per second. Tests show that the method balances the workload dynamically between two Processors in real-time applications.

FIG. 4A shows the processing time of each frame for the test sequence of "Susie" when $T_{dct}$=1000 without load balancing. In this case, the ME sub-process is significantly faster than the DCT-Q-SC one, therefore the processing time for a whole frame is much longer than that for the ME sub-process. The case is further illustrated within a frame in FIGS. 5A and 5B, in which the progress of ME in $P_1$ (measured as p) is faster and the idle time in $P_2$ (measured as $t_w$) is zero, except for two MBs when no load balancing is applied. When the load balancing method is applied, $T_{dct}$ increases from the initial value of 1000 to around 1600 by the end of the first frame, as shown in FIG. 6, and in consequence the DCT-Q-SC sub-process has been accelerated. $T_{dct}$ is adjusted constantly in the following frames to keep load-imbalance between $P_1$ and $P_2$ minimum. The load balancing effect can be seen when FIGS. 5A and 5B are compared with FIGS. 7A and 7B, which show the load pattern for the same frame when load balancing has been applied.

FIG. 7C shows the change of $T_{dct}$ for this frame. The timing improvement is obvious when comparing FIGS. 4A and 4B. Load balancing brings the processing time for the whole process close to that of ME.

Figure 9A:
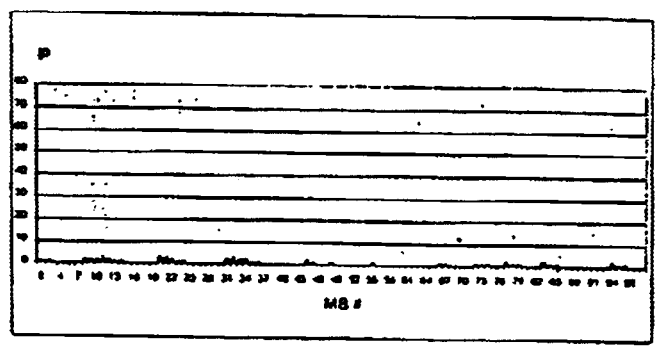
FIGS. 9A and 9B show the load pattern for a frame before balancing for the second example.
Figure 9B:
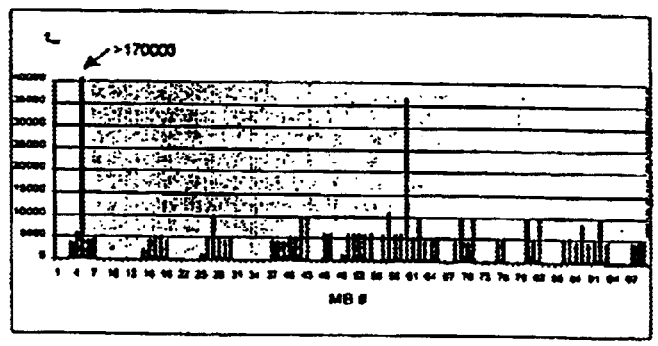
Figure 10:
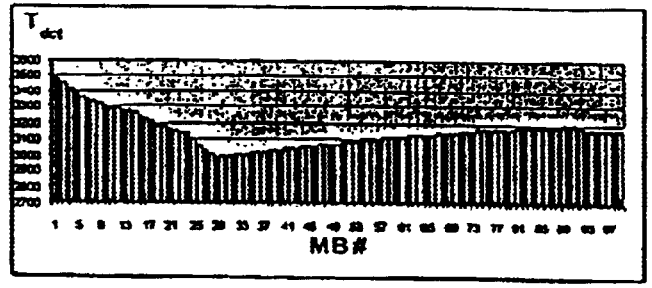
FIG. 10 shows the change in $T_{dct}$ during a frame with balancing for the second example.

FIG. 8A shows a case where the DCT-Q-SC sub-process is carried out faster ($T_{dct}$=3500) before balancing. The total processing time is close to the ME time in $P_1$ for each frame although $P_2$ is idle most of the time, as shown in FIGS. 9A and 9B. When the load-balancing algorithm is applied, since the idle time in $P_2$ is significant, $T_{dct}$ is adjusted from its initial value of 3500 to 3175 at the end of the 1st frame as shown in FIG. 10. The adjustment continues in the following frames until approximate balance is reached as shown in FIGS. 11A–11C. The timing with and without load balancing is similar, as can be seen from FIGS. 8A and 8B, but the computing power in $P_2$, lying idle when no load-balancing is applied, has been used for image quality improvement.

FIGS. 12A–12C show the comparison for the picture quality, mean bit count and average processing time, with and without load balancing, on different initial $T_{dct}$ values. Without load balancing, both image quality as measured by SNR (FIG. 12A) and mean bit count (FIG. 12B) are reduced with the increase of $T_{dct}$. This is reasonable because a larger $T_{dct}$ means that fewer DCT coefficients are coded. Average processing time at the lower end of $T_{dct}$ is much higher, since the DCT-Q-SC sub-process in $P_2$ takes significantly longer to be completed. With load balancing, SNR, mean bit count, and processing time per frame are all kept approximately constant for different initial $T_{dct}$ values. At the lower end of the initial $T_{dct}$ values, the invented method is capable of reducing the processing time and the bit count per frame (the speedup being 2.5 when initial $T_{dct}$=500 in FIG. 6(c)) by raising $T_{dct}$, without unduly compromising image quality.

At the higher end of the initial $T_{dct}$ values, the algorithms maintain the same processing time but result in higher image quality by lowering $T_{dct}$, with some small increase in bitstream length.

What is claimed is:

1. A method for balancing the workload between a first and second processing means for video encoding, the method comprising:
   measuring the load distribution dynamically between the first and second processing means, and
   adaptively adjusting the amount of computation performed by the second processing means based on said load distribution,
   wherein the first processing means performs motion estimation and motion estimation associated functions and the second processing means performs discrete cosine transformation (DCT), inverse discrete cosine transformation (IDCT), quantization, dequantization and source coding functions, and
   wherein the first processing means performs functions different than the second processing means.

2. The method of claim 1 wherein the measurement of the load distribution is realized by the measurement of the amount of idle time of the second processing means and counting the number of motion-estimation-completed macroblocks awaiting DCT.

3. The method of claim 2 wherein the measurement of the load distribution includes the measurement of the progress of motion estimation in the first processing means.

4. The method of claim 1 wherein adaptively adjusting the amount of computation performed by the second processing means is performed by dynamically determining whether or not any of DCT, IDCT, quantization and dequantization should be performed.

5. The method of claim 4 wherein the video to be coded contains frames divided into macroblocks, and wherein a parameter is determined for each macroblock which allows the second processing means to skip any of DCT, IDCT, quantization and dequantization for that macroblock.

6. The method of claim 4 wherein the video to be coded contains frames divided into macroblocks, and wherein a parameter is determined for each frame which allows the second processing means to skip any of DCT, IDCT, quantization and dequantization for the macroblocks of that frame.

7. The method of claim 5 wherein the measurement of the load distribution includes the determination of the idle time of the second processing means.

8. The method of claim 7 wherein the measurement of the load distribution includes the measurement of the progress of motion estimation in the first processing means.

9. A method for balancing the workload between a first processing means and a second processing means for video encoding of video frames divided into macroblocks, comprising:
   using the first processing means to perform motion estimation;
   using the second processing means to perform any of discrete cosine transformation (DCT), inverse discrete cosine transformation (IDCT), quantization and dequantization;
   determining the load distribution dynamically between the first and second processing means using a combination of the idle time of the second processing means and the progress of motion estimation in the first processing means; and
   determining for each macroblock whether any of DCT, IDCT, quantization and dequantization should be performed on that macroblock by the second processing means based on said load distribution.

10. The method of claim 9 wherein the determination for each macroblock as to whether DCT, IDCT, quantization and dequantization should be performed on that macroblock is effected by the use of a parameter which is dependent on the idle time of the second processing means and the progress of motion estimation in the first processing means.

11. A method for balancing the workload between a first processing means and a second processing means for video encoding of video frames divided into macroblocks, comprising:
   using the first processing means to perform motion estimation;
   using the second processing means to perform discrete cosine transformation (DCT), inverse discrete cosine transformation (IDCT), quantization and dequantization;
   determining a load pattern dynamically between the first and second processing means using a combination of the idle time of the second processing means and the progress of motion estimation in the first processing means; and
   determining for each frame of the video whether DCT, IDCT, quantization and dequantization should be performed on the macroblocks of that frame by the second processing means based on said load pattern.

12. A method for balancing the workload between a first processing means and a second processing means, the first processing means performing motion estimation functions and the second processing means performing discrete cosine transformation (DCT), inverse discrete cosine transformation (IDCT), quantization, dequantization and source coding functions, the first processing means performing functions different than the second processing means,
   wherein the amount of computation in the second processing means is reduced when the first processing means progresses faster than the second processing means; otherwise the amount of computation in the second processing means is increased.

13. A method for balancing the workload between a first and second processing means for video encoding, the first processing means performing motion estimation functions and the second processing means performing discrete cosine transformation (DCT), inverse discrete cosine transformation (IDCT), quantization, dequantization and source coding functions, the first processing means performing functions different than the second processing means, the method comprising the steps of:

measuring the load distribution dynamically between the first and second processing means, and adaptively adjusting the amount of computation performed by the second processing means based on said measured load distribution;

wherein the amount of computation in the second processing means is reduced when the first processing means progresses faster than the second processing means; otherwise the amount of computation in the second processing means is increased.

* * * * *